United States Patent
Hulkkonen et al.

(10) Patent No.: US 9,521,681 B2
(45) Date of Patent: Dec. 13, 2016

(54) SPECTRUM SHARING

(75) Inventors: Jari Yrjana Hulkkonen, Oulu (FI); Esa Tapani Tiirola, Kempele (FI); Mikko Saily, Helsinki (FI); Seppo Ilmari Vesterinen, Oulunsalo (FI)

(73) Assignee: Nokia Solutions and Networks Oy, Espoo (FI)

( * ) Notice: Subject to any disclaimer, the term of this patent is extended or adjusted under 35 U.S.C. 154(b) by 302 days.

(21) Appl. No.: 13/885,005

(22) PCT Filed: Jan. 7, 2011

(86) PCT No.: PCT/EP2011/050155
§ 371 (c)(1),
(2), (4) Date: May 28, 2013

(87) PCT Pub. No.: WO2012/062483
PCT Pub. Date: May 18, 2012

(65) Prior Publication Data
US 2013/0258979 A1    Oct. 3, 2013

(30) Foreign Application Priority Data

Nov. 11, 2010    (WO) ................. PCT/EP2010/067264

(51) Int. Cl.
*H04L 12/40*    (2006.01)
*H04W 72/08*    (2009.01)
*H04W 16/14*    (2009.01)
*H04W 24/02*    (2009.01)

(52) U.S. Cl.
CPC .......... *H04W 72/082* (2013.01); *H04W 16/14* (2013.01); *H04W 24/02* (2013.01); *H04W 72/085* (2013.01)

(58) Field of Classification Search
CPC .......... H04L 2012/5608; H04W 84/12; H04W 88/08; H04W 80/04; H04W 88/06; H04W 84/18; H04W 36/18; H04W 36/0011; H04W 36/14; H04W 36/08
USPC ............ 370/310.2, 328, 331, 332, 338, 343, 341,370/348, 437
See application file for complete search history.

(56) References Cited

U.S. PATENT DOCUMENTS

| 6,865,185 | B1 | 3/2005 | Patel et al. |
| 7,843,970 | B2 | 11/2010 | Yang |
| 2003/0050071 | A1 | 3/2003 | Shurvinton |
| 2004/0242158 | A1 | 12/2004 | Fattouch et al. |
| 2005/0239472 | A1* | 10/2005 | Wei .......................... 455/452.2 |
| 2009/0060094 | A1 | 3/2009 | Jung et al. |
| 2009/0298522 | A1* | 12/2009 | Chaudhri et al. ............. 455/509 |

(Continued)

FOREIGN PATENT DOCUMENTS

| CN | 101213763 A | 7/2008 |
| EP | 2043402 A2 | 4/2009 |

(Continued)

OTHER PUBLICATIONS

Garcia et al., "Autonomous Component Carrier Selection: Interference Management in Local Area Environments for LTE Advanced", IEEE Communications Magazine, Sep. 2009, p. 110-117.

(Continued)

*Primary Examiner* — Brenda H Pham
(74) *Attorney, Agent, or Firm* — Harrington & Smith (57) ABSTRACT

The invention relates to apparatuses, a method, computer program and computer-readable medium.

33 Claims, 2 Drawing Sheets (56) References Cited

U.S. PATENT DOCUMENTS

| | | | |
|---|---|---|---|
| 2010/0255794 A1 | 10/2010 | Agnew | 455/77 |
| 2010/0255867 A1 | 10/2010 | Ishii et al. | |
| 2010/0285810 A1 | 11/2010 | Ko et al. | |
| 2010/0323715 A1* | 12/2010 | Winters | 455/456.1 |
| 2011/0228666 A1* | 9/2011 | Barbieri | H04W 76/023 370/216 |
| 2013/0208604 A1 | 8/2013 | Lee et al. | |

FOREIGN PATENT DOCUMENTS

| | | |
|---|---|---|
| EP | 2120475 A1 | 11/2009 |
| WO | WO-2007/000740 A1 | 1/2007 |
| WO | WO-2010/091713 A1 | 8/2010 |
| WO | WO 2012/062364 A1 | 5/2012 |

OTHER PUBLICATIONS

Nokia Siemens Networks et al.; "Use of Background Interference Matrix for Autonomous Component Carrier Selection for LTE-Advanced"; R1-090235; 3GPP TSG RAN WG1 #55-bis Meeting, Ljubljana, Slovenia; Jan. 12-16, 2009; whole document (7 pages).
"Report ITU-R M.2225 (2011), Introduction to cognitive radio systems in the land mobile service; M Series, Mobile radiodetermination, amateur, and related satellite services"; International Telecommunication Union, ITU-R Radiocommunication Sector of ITU; whole document (17 pages).
Salmenkaita et al.; "Optimizing the GSM/EDGE Air Interface for Multiple Services with Dynamic Frequency and Channel Assignment"; Proceedings of the IEEE 56th Vehicular Technology Conference, VTC 2002—Fall; pp. 2215-2219.

* cited by examiner

SPECTRUM SHARING

FIELD

The invention relates to apparatuses, a method, computer program, computer program product and a computer-readable medium.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context. Recently need for more efficient usage of radio resources has brought out an idea of co-existence or sharing of systems meaning that systems share operational resources, for example spectrum in a given region at a time. This puts forward new challenges to interference management.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: define at least one virtual cell covering a geographical area, the at least one virtual cell being intended for a second type of communication; determine at least one estimate on potential interference caused by the at least one virtual cell to at least one neighbouring cell of a communication entity using the spectrum as a user of a first type of communication; identify available radio resources for usage of the at least one virtual cell, and select at least one radio resource from the identified available radio resources for the usage of the at least one virtual cell for the second type of communication based on the determined estimates.

According to another aspect of the present invention, there is provided a method comprising: defining at least one virtual cell covering a geographical area, the at least one virtual cell being intended for a second type of communication; determining at least one estimate on potential interference caused by the at least one virtual cell to at least one neighbouring cell of a communication entity using the spectrum as a user of a first type of communication; identifying available radio resources for usage of the at least one virtual cell, and selecting at least one radio resource from the identified available radio resources for the usage of the at least one virtual cell for the second type of communication based on the determined estimates.

According to yet another aspect of the present invention, there is provided an apparatus comprising: means for defining at least one virtual cell covering a geographical area, the at least one virtual cell being intended for a second type of communication; means for determining at least one estimate on potential interference caused by the at least one virtual cell to at least one neighbouring cell of a communication entity using the spectrum as a user of a first type of communication; means for identifying available radio resources for usage of the at least one virtual cell, and means for selecting at least one radio resource from the identified available radio resources for the usage of the at least one virtual cell for the second type of communication based on the determined estimates.

According to yet another aspect of the present invention, there is provided computer program embodied on a computer-readable storage medium, the computer program comprising program code for controlling a process to execute a process, the process comprising: defining at least one virtual cell covering a geographical area, the at least one virtual cell being intended for a second type of communication; determining at least one estimate on potential interference caused by the at least one virtual cell to at least one neighbouring cell of a communication entity using the spectrum as a user of a first type of communication; identifying available radio resources for usage of the at least one virtual cell, and selecting at least one radio resource from the identified available radio resources for the usage of the at least one virtual cell for the second type of communication based on the determined estimates.

LIST OF DRAWINGS

Embodiments of the present invention are described below, by way of example only, with reference to the accompanying drawings, in which.

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of access architectures to which the embodiments may be applied, a radio access architecture based on long term evolution (LTE) advanced, LTE-A, that is based on orthogonal frequency multiplexed access (OFDMA) in a downlink and a single-carrier frequency-division multiple access (SC-FDMA) in an uplink, without restricting the embodiments to such an architecture, however.

LTE (Long Term Evolution) is a project of the 3rd Generation Partnership Project (3GPP). The LTE is a step toward 4th generation (4G) of radio technologies designed to increase capacity and speed of mobile telephone networks. Actually the LTE is a 3.9G technology since it does not fully comply with the IMT Advanced 4G requirements. The LTE is a set of enhancements to the Universal Mobile Telecommunications System (UMTS). E-UTRA is an air interface of 3GPP Release 8 LTE (UTRA=UMTS terrestrial radio access, UMTS=universal mobile telecommunications system). Some advantages obtainable by the LTE (or E-UTRA) are a possibility to use "plug and play" devices, as well as Frequency Division Duplex (FDD) and Time Division Duplex (TDD) in the same platform.

LTE advanced is a development of the LTE designed to fulfil International Mobile Telecommunications (IMT) Advanced 4G requirements. It is currently being standardized for 3GPP Release 10. The LTE advanced supports higher order multiple-input-multiple-output (MIMO) in the downlink (up-to 8 streams), single-user MIMO in the uplink (up-to 4 streams) and carrier aggregation (up to 5 component carriers each 20 MHz) in the both uplink and downlink.

The LTE (advanced) is based on orthogonal frequency multiplexed access (OFDMA) in the downlink and a single-carrier frequency-division multiple access (SC-FDMA) in the uplink.

In an orthogonal frequency division multiplexing (OFDM) system, the available spectrum is divided into multiple orthogonal sub-carriers. In OFDM systems, available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB needs to know channel quality of each user device and/or the preferred precoding matrices (and/or other multiple input-multiple output (MIMO) specific feedback information, such as channel quantization) to schedule transmissions to user devices. Required information is usually signalled to the (e)NodeB.

Figure 1:
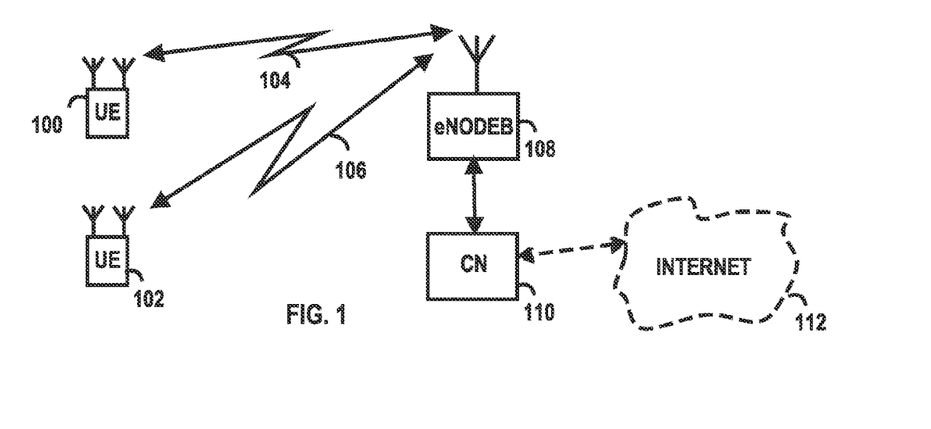
FIG. 1 illustrates an example of a system.

FIG. 1 is an example of a simplified system architecture only showing some elements and functional entities, all being logical units whose implementation may differ from what is shown. The connections shown in FIG. 1 are logical connections; the actual physical connections may be different. It is apparent to a person skilled in the art that the system typically comprises also other functions and structures than those shown in FIG. 1.

FIG. 1 shows a part of a radio access network of E-UTRA, LTE or LTE-advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

The embodiments are not, however, restricted to the systems given as an example but a person skilled in the art may apply the solution to other communication systems provided with the necessary properties. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), wideband code division multiple access (WCDMA), code division multiple access (CDMA), groupe special mobile or global system for mobile communications (GSM), enhanced data rates for GSM evolution (GSM EDGE or GERAN), systems using ultra-wideband (UWB) technology and different mesh networks. Embodiments are especially suitable for co-existence networks of two or more systems.

FIG. 1 shows user devices 100 and 102 configured to be in a wireless connection on one or more communication channels 104, 106 in a cell with an LTE (e)NodeB 108 providing the cell. The physical link from a user device to an LTE (e)NodeB is called uplink or reverse link and the physical link from the LTE NodeB to the user device is called downlink or forward link.

The NodeB, or advanced evolved node B (eNodeB, eNB) in LTE-advanced, is a computing device configured to control the radio resources of a communication system it is coupled to. The (e)NodeB may also be referred to a base station, an access point or any other type of interfacing device including a relay station capable of operating in a wireless environment. The (e)NodeB may also be a virtual node, if real-world processing is carried out in a distant network processing centre coupled to a physical cell, by fiber cables, for instance.

The (e)NodeB includes at least one transceiver, for instance. From the transceivers of the (e)NodeB, a connection is provided to an antenna unit that establishes bi-directional radio links to user devices. The (e)NodeB is further coupled to a core network 110 (CN). Depending on the system, the counterpart on the CN side for the LTE may be a serving gateway (S-GW) (routing and forwarding user data packets), packet data network gateway (P-GW), for providing connectivity to user devices (UEs) to external packet data networks, or mobile management entity (MME), etc.

The communication systems are typically also able to communicate with other networks, such as a public switched telephone network or the Internet 112.

The user device illustrates one type of an apparatus to which resources on the air interface may be allocated and assigned, and thus any feature described herein with a user device may be implemented with a corresponding apparatus. The user device may also be called a subscriber unit, mobile station, remote terminal, access terminal, user terminal or user equipment (UE) just to mention but a few names or apparatuses.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that what is depicted is only an example of a part of a radio access systems and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. For example, the (e)NodeB 108 of FIG. 1 may provide any kind of these cells. A cellular radio system may be implemented as a multilayer network including several kinds of cells. Typically, in multilayer networks, one (e)NodeB provides one kind of a cell or cells, and thus a plurality of (e)NodeBs are required to provide such a network structure. Recently for fulfilling the need for improving the deployment and performance of communication systems, concept of "plug-and-play" (e)NodeBs has been introduced. Typically, in the LTE (advanced), a network which is able to use "plug-and-play" node (e)Bs, includes, in addition to Home (e)NodeBs (Home(e)nodeBs), a home node B gateway, or HNB-GW (not shown in FIG. 1). A HNB Gateway (HNB-GW), which is typically installed within an operator's network aggregates traffic from a large number of HNBs back to a core network through Iu-cs and Iu-ps interfaces.

With increasing number of personal, local and wireless communication systems operating in a same geographical area, the questions of co-existence and inter-networking are raised. Cognitive and re-configurable radios may be a key for obtaining a heterogeneous communication environment where mitigation techniques and cognitive signalling are used for sharing the spectrum and routing information.

Cognitive radios are designed to efficient spectrum use deploying so-called smart wireless devices being capable to sense and detect the environment and adapt to it thus being suitable for opportunistic spectrum usage, in which also the frequency bands not being used by their primary (usually licensed) users may be utilized by secondary users. For this purpose cognitive radios are designed to detect unused spectrum, such as spectrum holes.

The heterogeneous networks (HetNets) may also create new interference challenges due to the deployment of different wireless nodes such as macro/micro eNBs, pico eNBs, and Home eNBs (possibly with a closed subscriber group (CSG), or a hybrid combination of a CSG and open access in (Home)eNB) creating a multi-layer network using the same spectrum resource. In the following, some embodiments of a method for enabling shared spectrum usage are explained in further detail by means of FIG. 2.

Typically, in a geographical area, a system (or a cell or layer) in which a licensed user has a primary user status and possible ad-hoc users or opportunistic users which are ready to use spectrum holes or corresponding resources are called secondary users. Secondary users are typically not allowed to cause too much interference to primary users.

One example of implementation of an embodiment of the method is wherein a wide area system or systems (GSM, CDMA, WCDMA, HSPA, WiMAX, LTE or their evolution, etc.) are a primary system(s) using radio resources, and a local access system is a secondary system using the same spectrum aiming to utilize spectrum holes. Local Access (LA) can be e.g. femto-cell, device-to-device or machine-to-machine communication or a relay node. In a typical implementation case, a LA has dedicated resources to ensure continuous operation and additional resources that is spectrum holes from a wide area system for example. The additional resources are used to increase capacity when allowed by radio environment. Especially, outgoing interference from a secondary spectrum usage to each primary system needs to be estimated and controlled to ensure low interference towards the primary wide area systems.

Embodiments provide a network controlled and/or assisted approach wherein the secondary usage of spectrum may be controlled by the network instead of every user device sensing spectrum holes by itself in a decentralized manner. Embodiments may also be used in multi-radio access technology systems in such manner that information gathered in one system may be available to other systems as well.

Figures 2, 4:
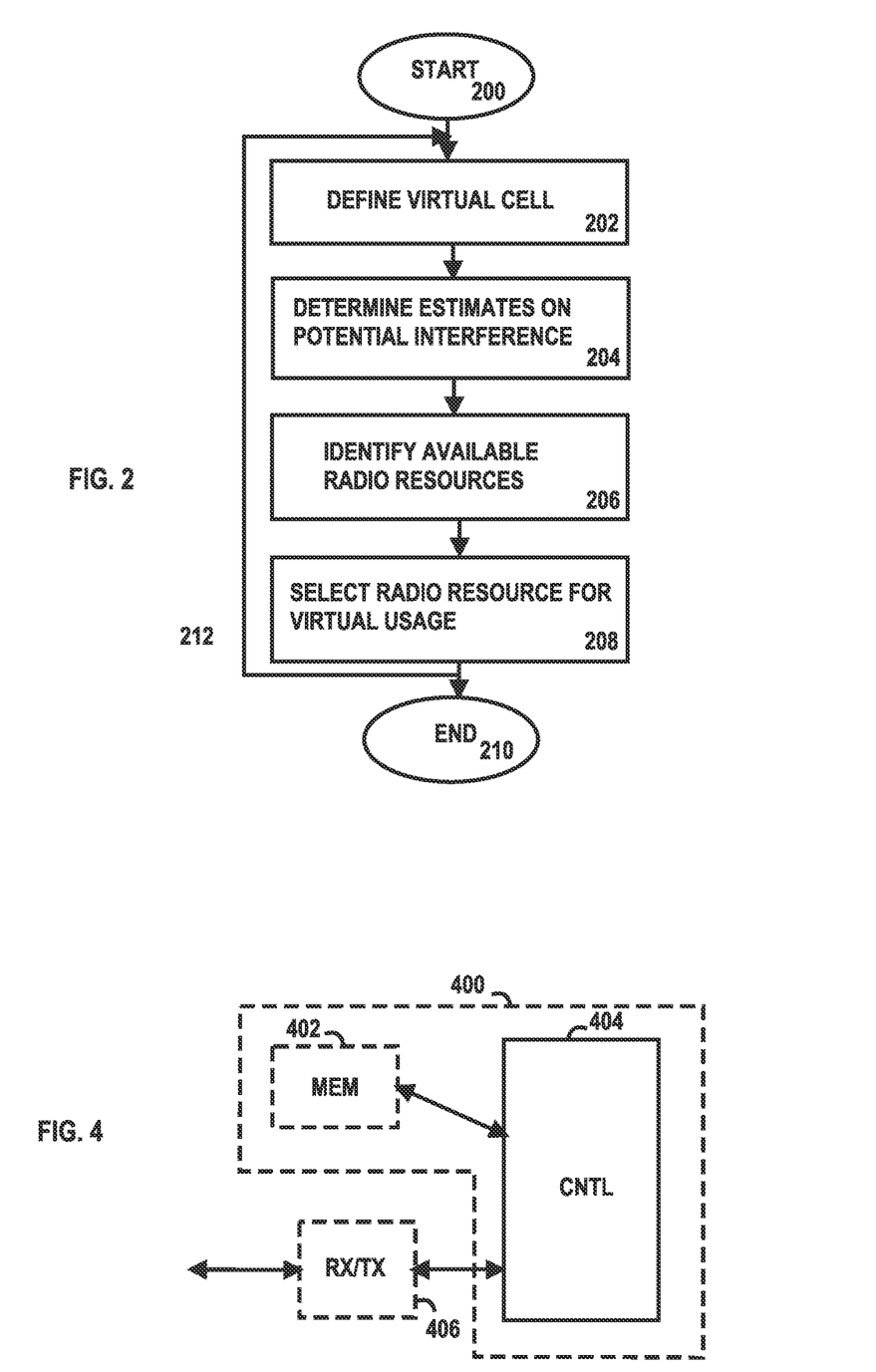
FIG. 2 is a flow chart.
FIG. 4 shows an example of an apparatus.

An embodiment starts in block 200.

In block 202, at least one virtual cell covering a geographical area is defined. This at least one virtual cell is intended for a second type of communication.

The second type of communication may be secondary spectrum usage, local area communications, device-to-device or machine-to-machine communications and/or ad-hoc communications. When a carrier aggregation is used, the second type of communication may be a secondary component carrier in addition to at least one of the previous possibilities or alone.

A virtual cell may be defined for a geographical area. The virtual cell may be different than any of existing "real-world" cells in a network. The coverage area of the virtual cell is typically relatively small and designed to be used for local access. The virtual cell may also be defined by the network (or (e)NB), or alternatively it may be a grid of virtual cells defined autonomously for a certain geographical area.

Virtual cells may be defined on the basis of load conditions. Hence, the virtual cells may be designed to increase capacity on traffic hot spot locations. In this case, the aim is to increase capacity in local access, such as offload traffic from wide area cells.

In a co-existence of several wide area systems, such as the GSM, high speed packet access (HSPA) and LTE, spectrum holes may be searched for all different spectrum options. It should be appreciated that several frequency bands are used by wide area system radio protocols, such as 900 MHz, 1800 MHz, 2100 MHz, and 2600 MHz, and the number is most probably increasing in the future. Moreover, other available radio frequency bands may be considered, such as white spaces (TV channels or C-band), or license exempt bands which are or will be available for wireless data traffic.

A network operator may determine (or launch a process for determination of) virtual cells, for instance on the basis of traffic conditions to increase capacity or poor coverage to improve it. Another option is that a network may autonomously define virtual cells for the same purposes. Virtual cells may be created for local access communication, machine-to-machine or device-to-device communication, and/o relay nodes. A virtual cell may be a sector or a sub-sector of an existing cell and it may be designed to be used in beamforming.

Virtual cells may be based on a grid of cells with predefined and pre-specified sizes. This is especially suitable for a multi-operator case.

In one option, a virtual cell coverage area is equal to the coverage area of an existing cell or a group of existing cells in the network.

In block 204, at least one estimate on potential interference caused by the at least one virtual cell to at least one neighbouring cell of a communication entity being a user of a first type of communication is determined.

The first type of communication may be primary spectrum usage, licenced spectrum usage and/or wide area communications. When a carrier aggregation is used, the first type of communication may be a primary component carrier in addition to at least one of the previous possibilities or alone.

Potential interference between existing cells, such as wide area cells, and virtual cells may be estimated based on user device and/or node measurements. Information on the location of a user device (such as global positioning system (GPS) measurements or cell measurements which user device reports to a network) may also be used in combination with the user device and/or node measurements. It should be understood that the location information may also be an estimate made by an appropriate network element, such as a node. Another option may be that a node requests the user device to report its location information together with pathloss measurements.

Interference estimation may be carried out by collecting measurements to a statistically sufficient number and defining a conditional interference estimate from the distribution. This is a suitable procedure especially when estimates are gathered in a multi-layer background interference matrix (MLBIM). The principle of the MLBIM is clarified below by using an example.

Additionally, storage for determined estimates may be created. In the storage, at least one virtual cell may be linked to at least one cell of a user of a first type of communication. An example of the form of such storage is a multi-layer background interference matrix (MLBIM).

In an MLBIM-table, each virtual cell layer includes estimates on potential interference from virtual cells to their neighbouring cells. It should be understood that also a one-layer background interference matrix (BIM) may be used. The concept of the MLBIM-table is explained in PCT/EP2010/067264 which is taken herein as a reference.

Figures 3A, 3B:
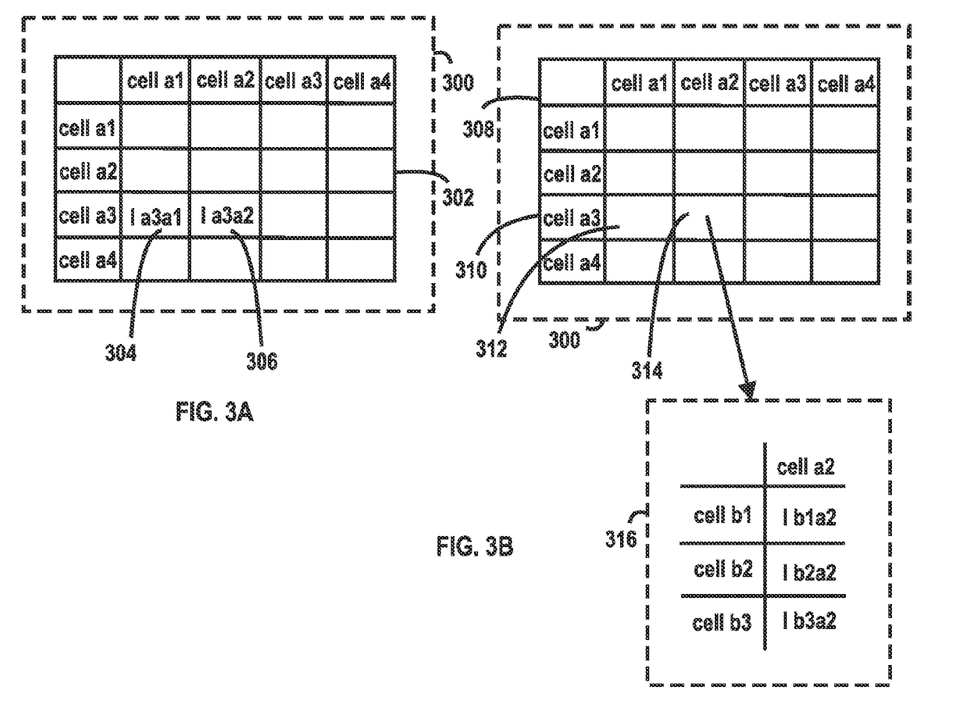
FIG. 3 is an example of a data storage.

An example of the multi-layer table will be explained in further detail by means of FIGS. 3A and 3B. In the example, the information estimate storage 300 is a table. In FIG. 3A, the first layer 302 of the table (first table layer) is depicted. The first layer includes interference estimates of a primary communication entity. In location 304, an estimate for interference from cell 3 of communication entity "a" to cell 1 of communication entity "a" is provided, and in location 306, an estimate for interference from cell 3 of communication entity "a" to cell 2 of communication entity "a" is provided. That is to say the first layer comprises interference estimates within one primary communication entity.

In FIG. 3B, the second layer of the exemplifying table is depicted. The second layer (second table layer) 308 includes interference estimates on interference a secondary communication entity "b" may cause to a primary communication entity "a". Master cells are marked column-wise and "normal" primary cells are marked row-wise. Cell "a3" is taken as an example of master cells 310. In location 312, interference estimates for interference from cells of communication entity "b" to communication entity "a" cell 1 are provided (not shown), and in location 314, interference estimates for interference from cells of communication entity "b" to communication entity "a" cell 2 are provided (shown as table 316). The table 316 shows an example of a possible content of the second table layer. In this example, master cell "a3" has three secondary cells "b1", "b2" and "b3", and the table 316 includes interference estimates for interference which may be caused by the cells "b1", "b2" and "b3" to the cell 2 of the primary communication entity "a".

It should be understood that the table of FIGS. 3A and 3B is only an example presented herein for clarification purposes, and it does not limit the implementation of embodiments by any means.

Measurements for a BIM or multi-layer BIM may be collected from more than one system or layer (practical networks typically have several layers and/or several co-existing systems), or interference estimations obtained in or for one system may be used to evaluate interference between different systems.

In block 206, available radio resources for a usage of the at least one virtual cell are identified.

Some examples of possible radio resources are time resources, frequency resources, code resources and/or resources that are shared spatially.

In a cellular radio system, a network typically has real-time information on options for radio resource allocation. Temporally available radio resources for virtual cell may be identified by combining real-time radio resource allocation information with the estimates on potential interference.

Information on unused radio resources per a virtual cell may be identified. It should be understood that this information is typically time-varying of nature. The usage of the resources is usually aimed to be temporal.

Identification of available resources may be based on criteria, threshold values for example, setting upper limits for interference caused by radio resource usage in a virtual cell to "real-world" cells. Thresholds are typically set resource-wise and they may be updated on a regular basis or when required.

When a virtual cell is active, quality measurement results may be gathered from active connections in the virtual cell and the measurement results may be used to adjust transmission parameters. In this manner, a network is able to learn about environment to optimize its parameters, as already explained above in relation to cognitive radio. The transmission parameters may be maximum allowed transmission power per a radio resource or power spectral density, etc.

Available radio resources for virtual cells may be prioritised based on allowed maximum transmission power, continuous spectrum and/or availability in the time domain, for instance. Alternatively, available radio resources may be prioritised based on overall availability of the radio resources, such as whether full allocation or limited allocation is possible based on estimated load, number of potential users, etc.

Information about unused radio resources for virtual cells may be updated on a regular basis in order to have real time information. Alternatively, updating may be carried out on a need basis in which case it may be triggered by a network. Available radio resources per one or more virtual cells may be stored in a database, such as a cognitive radio database. A cognitive pilot channel may be used to share information about the virtual cells and available radio resources stored in the database.

In block 208, at least one radio resource from the identified available radio resources is selected for the usage of the at least one virtual cell for the second type of communication based on the determined estimates.

Information on available radio resources allocation may be used together with estimates on potential interference. One or more threshold values setting upper limits for interference towards a primary system (wide area system in this example) may be used. When the thresholds are met and/or exceeded, secondary usage in a virtual cell is not allowed, and if not met, the secondary usage is allowed.

One design option is that in the frequency domain, spectrum is split into carriers matching to a primary system configuration. Moreover, a scaling factor may be required, when interference between different systems is estimated, to make interference estimates from different systems comparable. Information on virtual cells and available radio resources may be stored in a database that may be located in an operation and maintenance entity of a network. The network may thus take care of allocating suitable radio resources to the virtual cells. Interference control between local access cells, nodes and/or devices, may be carried out by the network or it may be an independent method especially when the virtual cells cover multiple local access cells. The availability of the virtual cells and the database may be informed via system info conveyed on a broadcast control channel (BCCH). For a two-way access between a user device and the database it is possible to use access network discovery and selection function (ANDSF) specified for 3GPP systems.

In future implementations of the cognitive radio concept, it is also possible to have an inter-operator database including information on virtual cells and time-varying availability of radio resources for them (this may be seen as some kind of a spectrum-hole map). In that case specification is needed for virtual cell definition. It may be based on a grid of fixed-size cells in a certain geographical area.

The embodiment ends in block 210. The embodiment is repeatable and one option for repetition is shown with arrow 212. Other options are naturally also possible.

The steps/points, signaling messages and related functions described above in FIG. 2 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

It should be understood that transmitting and/or receiving may herein mean preparing a transmission and/or reception, preparing a message (or a part of a message) to be transmitted and/or received, or physical transmission and/or reception itself, etc on a case by case basis. Additionally, conveying information may mean initiation of a message (or a part of a message), or physical conveying, such as transmission, etc. depending on a current application.

An embodiment provides an apparatus which may be any node device, host, server or any other suitable apparatus able to carry out processes described above in relation to FIG. 2. FIG. 4 illustrates a simplified block diagram of an apparatus according to an embodiment especially suitable for spectrum sharing. It should be appreciated that the apparatus may also include other units or parts than those depicted in FIG. 4. Although the apparatus has been depicted as one entity, different modules and memory (one or more) may be implemented in one or more physical or logical entities.

The apparatus 400 may in general include at least one processor, controller or a unit designed for carrying out control functions operably coupled to at least one memory unit and to various interfaces. Further, a memory unit may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus.

The apparatus may be a software application, or a module, or a unit configured as arithmetic operation, or as a program (including an added or updated software routine), executed by an operation processor. Programs, also called program products or computer programs, including software routines, applets and macros, can be stored in any apparatus-readable data storage medium and they include program instructions to perform particular tasks. Computer programs may be coded by a programming language, which may be a high-level programming language, such as objective-C, C, C++, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, element, unit, etc., may be configured as a computer or a microprocessor, such as a single-chip computer element, or as a chipset, including at least a memory for providing storage capacity used for arithmetic operation and an operation processor for executing the arithmetic operation.

As an example of an apparatus according to an embodiment, it is shown an apparatus, such as a node device or network element, including facilities in a control unit 404 (including one or more processors, for example) to carry out functions of embodiments according to FIG. 2. This is depicted in FIG. 4.

The apparatus may also include at least one processor 404 and at least one memory 402 including a computer program code, the at least one memory and the computer program code configured to, with the at least one processor, cause the apparatus at least to: define at least one virtual cell covering a geographical area, the at least one virtual cell being intended for a usage of a second kind of communication, determine at least one estimate on potential interference caused by the at least one virtual cell to at least one neighbouring cell of a communication entity using the spectrum as a user of a first kind of communication, identify available radio resources for usage of the at least one virtual cell, and select at least one radio resource from the identified available radio resources for the usage of the at least one virtual cell for a usage of the second kind of communication based on the determined estimates.

Another example of an apparatus comprises means 404 for defining at least one virtual cell covering a geographical area, the at least one virtual cell being intended for a usage of a second kind of communication, means 404 for determining at least one estimate on potential interference caused by the at least one virtual cell to at least one neighbouring cell of a communication entity using the spectrum as a user of a first kind of communication, means 404 for identifying available radio resources for usage of the at least one virtual cell, and means 404 for selecting at least one radio resource from the identified available radio resources for the usage of the at least one virtual cell for a usage of the second kind of communication based on the determined estimates.

Yet another example of an apparatus comprises an definer configured to define at least one virtual cell covering a geographical area, the at least one virtual cell being intended for a usage of a second kind of communication, a determiner configured to determine at least one estimate on potential interference caused by the at least one virtual cell to at least one neighbouring cell of a communication entity using the spectrum as a user of a first kind of communication, an identifier configured to identify available radio resources for usage of the at least one virtual cell, and a selector configured to select at least one radio resource from the identified available radio resources for the usage of the at least one virtual cell for a usage of a the second kind of communication based on the determined estimates.

Embodiments of FIG. 2 may be carried out in a processor or control unit 404 possibly with aid of a memory 402 as well as a transmitter and/or receiver 406.

It should be appreciated that different units may be implemented as one module, unit, processor, etc, or as a combination of several modules, units, processor, etc.

It should be understood that the apparatuses may include other units or modules etc. used in or for transmission. However, they are irrelevant to the embodiments and therefore they need not to be discussed in more detail herein. Transmitting may herein mean transmitting via antennas to a radio path, carrying out preparations for physical transmissions or transmission control depending on the implementation, etc. The apparatus may utilize a transmitter and/or receiver which are not included in the apparatus itself, such as a processor, but are available to it, being operably coupled to the apparatus. This is depicted as an option in FIG. 4 as a transceiver 406.

An embodiment provides a computer program embodied on a distribution medium, comprising program instructions which, when loaded into electronic apparatuses, constitute the apparatuses as explained above.

Another embodiment provides a computer program embodied on a computer readable medium, configured to control a processor to perform embodiments of the methods described above.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processor and at least one memory including a computer program code, the at least one memory and the computer program code configured to, with the at least one processor, cause the apparatus at least to:
define at least one virtual cell covering a geographical area comprising primary users and secondary users, the at least one virtual cell being intended for a second type of communication comprising device-to-device communications;
determine at least one estimate on potential interference caused by the at least one virtual cell to at least one neighbouring cell of a communication entity using the spectrum as a user of a first type of communication;
identify available radio resources for usage of the at least one virtual cell, wherein the identification of available radio resources is carried out according to at least one threshold value setting an upper limit for interference towards the at least one neighbouring cell, wherein when the at least one threshold value is met or exceeded, the second type of communication in the virtual cell is not allowed, and when the at least one threshold value is not met, the second type of communication in the virtual cell is allowed; and
select at least one radio resource from the identified available radio resources for the usage of the at least one virtual cell for the second type of communication based on the determined estimates.

2. The apparatus of claim 1, wherein the at least one estimate on the potential interference is obtained by using information on a location of a user device and at least one of the following: user device and node measurements.

3. The apparatus of claim 2, wherein the determination of the at least one estimate on the potential interference is based on a statistical distribution of the at least one of the following: user device and node measurements.

4. The apparatus of claim 1, further configured to:
prioritize the available radio resources for virtual cells based on at least one of the following: allowed maximum transmission power, continuous spectrum, availability in the time domain, overall availability of the radio resources.

5. The apparatus of claim 1, further configured to:
store information on the available radio resources in a database located in an operation and maintenance entity of a network, and the information is conveyable on a broadcast control channel.

6. The apparatus of claim 5, further configured to: use an access network discovery and selection function as a two-way access between a user device and the database.

7. The apparatus of claim 1, wherein the first type of communication is at least one of the following: primary spectrum usage, licenced spectrum usage and wide area communications.

8. The apparatus of claim 7, wherein if a carrier aggregation is used, the first type of communication may be a primary component carrier and the second type of communication may be a secondary component carrier.

9. The apparatus of claim 1, further configured to:
create a storage for the determined estimates, wherein the at least one virtual cell is linked to at least one cell of the communication entity using the spectrum as the user of the first type of communication.

10. The apparatus of claim 9, wherein the storage for the determined estimates is a multi-layer background interference matrix, wherein each of the at least one virtual cell performs a virtual cell layer including the at least one estimate on the potential interference.

11. The apparatus of claim 1, the apparatus comprising a server, host, node device or a user device.

12. The apparatus of claim 1, wherein the primary users are licensed users and the selected at least one radio resource is used for the device-to-device communication with at least one of the secondary users.

13. A method comprising:
defining at least one virtual cell covering a geographical area comprising primary users and secondary users, the at least one virtual cell being intended for a second type of communication comprising device-to-device communications;
determining at least one estimate on potential interference caused by the at least one virtual cell to at least one neighbouring cell of a communication entity using the spectrum as a user of a first type of communication;
identifying available radio resources for usage of the at least one virtual cell, wherein the identification of available radio resources is carried out according to at least one threshold value setting an upper limit for interference towards the at least one neighbouring cell, wherein when the at least one threshold value is met or exceeded, the second type of communication in the virtual cell is not allowed, and when the at least one threshold value is not met, the second type of communication in the virtual cell is allowed; and
selecting at least one radio resource from the identified available radio resources for the usage of the at least one virtual cell for the second type of communication based on the determined estimates.

14. A non-transitory computer readable storage medium encoded thereon program instructions which, when executed by a processor, to perform the method of claim 13.

15. The method of any claim 13, wherein the at least one estimate on the potential interference is obtained by using information on a location of a user device and at least one of the following: user device and node measurements.

16. The method of claim 13, wherein the determination of the at least one estimate on the potential interference is based on a statistical distribution of the at least one of the following: user device and node measurements.

17. The method of claim 13, further comprising:
prioritizing the available radio resources for virtual cells based on at least one of the following: allowed maximum transmission power, continuous spectrum, availability in the time domain, overall availability of the radio resources.

18. The method of claim 13, further comprising:
storing information on the available radio resources in a database located in an operation and maintenance entity of a network, and the information is conveyable on a broadcast control channel.

19. The method of claim 18, further comprising:
using an access network discovery and selection function as a two-way access between a user device and the database.

20. The method of claim 13, wherein the first type of communication is at least one of the following: primary spectrum usage, licenced spectrum usage and wide area communications.

21. The method of claim 20, wherein if a carrier aggregation is used, the first type of communication may be a primary component carrier and the second type of communication may be a secondary component carrier.

22. The method of claim 13, further comprising:
creating a storage for the determined estimates, wherein the at least one virtual cell is linked to at least one cell of the communication entity using the spectrum as the user of the first type of communication.

23. The method of claim 22, wherein the storage for the determined estimates is a multi-layer background interference matrix, wherein each of the at least one virtual cell performs a virtual cell layer including the at least one estimate on the potential interference.

24. A non-transitory computer-readable storage medium, stored thereon a computer program comprising program code which, when executed by a processor, causes the processor to perform:
defining at least one virtual cell covering a geographical area comprising primary users and secondary users, the at least one virtual cell being intended for a second type of communication;
determining at least one estimate on potential interference caused by the at least one virtual cell to at least one neighbouring cell of a communication entity using the spectrum as a user of a first type of communication comprising device-to-device communications;
identifying available radio resources for usage of the at least one virtual cell, wherein the identification of available radio resources is carried out according to at least one threshold value setting an upper limit for interference towards the at least one neighbouring cell, wherein when the at least one threshold value is met or exceeded, the second type of communication in the virtual cell is not allowed, and when the at least one threshold value is not met, the second type of communication in the virtual cell is allowed; and
selecting at least one radio resource from the identified available radio resources for the usage of the at least one virtual cell for the second type of communication based on the determined estimates.

25. The non-transitory computer-readable storage medium of claim 24, wherein the at least one estimate on the potential interference is obtained by using information on a location of a user device and at least one of the following: user device and node measurements.

26. The non-transitory computer-readable storage medium of claim 24, wherein the determination of the at least one estimate on the potential interference is based on a statistical distribution of the at least one of the following: user device and node measurements.

27. The non-transitory computer-readable storage medium of claim 24, further comprising:
prioritizing the available radio resources for virtual cells based on at least one of the following: allowed maximum transmission power, continuous spectrum, availability in the time domain, overall availability of the radio resources.

28. The non-transitory computer-readable storage medium of claim 24, further comprising:

storing information on the available radio resources in a database located in an operation and maintenance entity of a network, and the information is conveyable on a broadcast control channel.

29. The non-transitory computer-readable storage medium of claim 28, further comprising:
using an access network discovery and selection function as a two-way access between a user device and the database.

30. The non-transitory computer-readable storage medium of claim 24, wherein the first type of communication is at least one of the following: primary spectrum usage, licenced spectrum usage and wide area communications, and wherein the second type of communications is at least one of the following: secondary spectrum usage, local area communications, device-to-device or machine-to-machine communications and ad-hoc communications.

31. The non-transitory computer-readable storage medium of claim 30, wherein if a carrier aggregation is used, the first type of communication may be a primary component carrier and the second type of communication may be a secondary component carrier.

32. The non-transitory computer-readable storage medium of claim 24, further comprising:
creating a storage for the determined estimates, wherein the at least one virtual cell is linked to at least one cell of the communication entity using the spectrum as the user of the first type of communication.

33. The non-transitory computer-readable storage medium of claim 32, wherein the storage for the determined estimates is a multi-layer background interference matrix, wherein each of the at least one virtual cell performs a virtual cell layer including the at least one estimate on the potential interference.

\* \* \* \* \*